United States Patent Office 3,099,722
Patented July 30, 1963

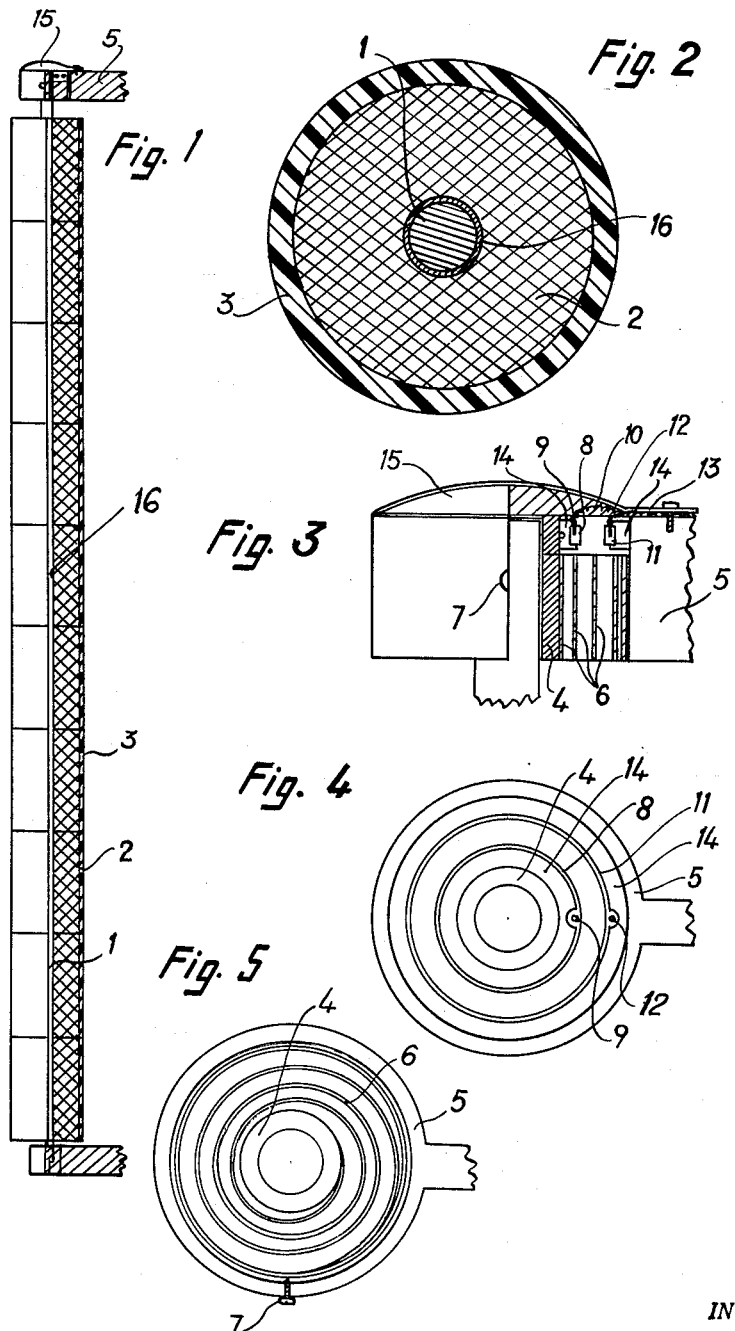

3,099,722
FLOATING SUSPENSION INCLUDING SWITCHING MEANS FOR FRICTION ROLLERS
Luis Vila Gracia, 72 Paseo San Juan, Barcelona, Spain
Filed Dec. 19, 1960, Ser. No. 76,728
Claims priority, application Spain Dec. 28, 1959
3 Claims. (Cl. 200—61.41)

The present invention relates to improvements in friction rollers.

Friction rollers as used today in all kinds of machines or applications where they are necessary, enjoy all kinds of improvements concerning shock absorption, gyratory security and other qualities, but do not possess practical advisory systems that indicate the energy expended in the deviation of their gyratory centers, which is quite often very necessary, such as required in textile drawing where a predetermined fibre thickness is desired; or at the entrances to garages that offer restricted room for the passing of the vehicles, rendering it necessary to know whether the sides of the vehicle are chafing against the sides of the garage doorway, where these improved friction rollers could advantageously be installed.

In the circumstances just mentioned, the friction roller consisting of a somewhat hard but elastic material, is pushed to one side together with its supporting gyratory axis, and if pushed far enough will cause two electric contacts to close which are connected in a circuit containing an acoustic or visual warning device, or both; while in the case of machinery where the thickness of passing material has to be controlled, said contacts are connected in a circuit for stopping the motor driving said machinery in order to prevent the production of defective material.

In order to better explain the invention, a sheet of drawings is included herewith, in which one method of realising the invention is shown as an example.

FIGURE 1 is a side elevation partly in section of an apparatus according to the invention.

FIGURE 2 is a cross section of the roller and its supporting shaft.

FIGURE 3 is a side view partly in section of one of the roller and shaft supports.

FIGURE 4 is a plan of the upper part of one support, in which the cover is omitted.

FIGURE 5 is a plan of the lower part of one support of the roller and its shaft.

By referring to these drawings it will be seen that the apparatus comprises a metallic shaft 1 within a metal tube 16 around which are fitted rollers consisting of an elastic core 2 surrounded by an exterior layer of plastic material 3, the rollers, FIG. 2, being mounted one on top of the other forming one long cylinder with the shaft 1 as their central support, this sectional mounting being adopted to facilitate the renewal of any roller section that may become worn or damaged. The ends of the shaft 1 protrude from the column of rollers and are located in bearings made of bronze 4, which latter are connected to a support 5 through a flat spiral spring 6 by means of a screw 7 accessible from the exterior for dismounting purposes.

The bearing support 5 contains the bronze bush 4 and the flat spiral spring 6, which latter does not reach to the bottom of the support 5 as seen in FIG. 3, but leaves room for two contact rings 8 and 11 arranged concentrically, provided with terminals 9 and 12 for connecting to wires leading to the exterior signalling device, the ring 8 being fixed to the bushing 4 by means of an insulating ring 14, while the other ring 11 is similarly fixed to the support 5 by means of another insulating ring 14.

The cylindrical roller upon receiving a pressure or blow superior to the capacity of the flat spiral spring 6 during operation, is displaced laterally, and if the pressure is sufficient, the two rings 8 and 11 make contact, closing thereby the circuit containing the acoustic or visual alarm, or both at the same time.

The bearing support 5 may be provided with a cover 15, held in position by any convenient means, preferably screwed. The whole apparatus then is supported on two of such spring centered moveable bearings, one at each end of the roller column, or on one only of such supports at one extremity, while the other bearing support may be of any conventional kind which will allow the lateral movement of the central shaft 1 in conformity with the movement of said shaft laterally in the spring centered electric contact bearing support situated at the opposite extremity.

The invention may be realised in forms that vary from that shown in the example given in the drawing, while any variations in dimensions or the construction from any adequate materials may be adopted without departing in any way from the essentiality and the spirit of the invention as contained within the claims.

What I claim is:

1. In friction rollers comprising a shaft and friction rollers on said shaft, the improvement comprising a floating suspension for one end of said shaft comprising a bearing having a bushing, a support for said bushing, a spiral spring concentric with said bearing whose ends are connected one to said bushing and the other to said support, a first electrical contact ring insulated from and supported by said bushing and a second electrical contact ring insulated from and supported by said support arranged concentrically outside said first ring with an annular space between said two contact rings.

2. An improvement according to claim 1 wherein means are provided for connecting said rings so that a circuit is closed whenever any pressure is exerted against said friction rollers and thus bring the two contact rings into electric connection, due to the lateral displacement of said shaft.

3. An improvement according to claim 1 wherein means are provided to maintain separate said electrical contact rings and closing them when the shaft is inclined laterally.

References Cited in the file of this patent
UNITED STATES PATENTS

| | | |
|---|---|---|
| 1,576,950 | Conklin | Mar. 16, 1926 |
| 2,740,856 | Doeg | Apr. 3, 1956 |
| 2,881,275 | Powell | Apr. 7, 1959 |

FOREIGN PATENTS

| | | |
|---|---|---|
| 353,706 | Germany | May 26, 1922 |